INVENTOR.
FRED M. MAYES

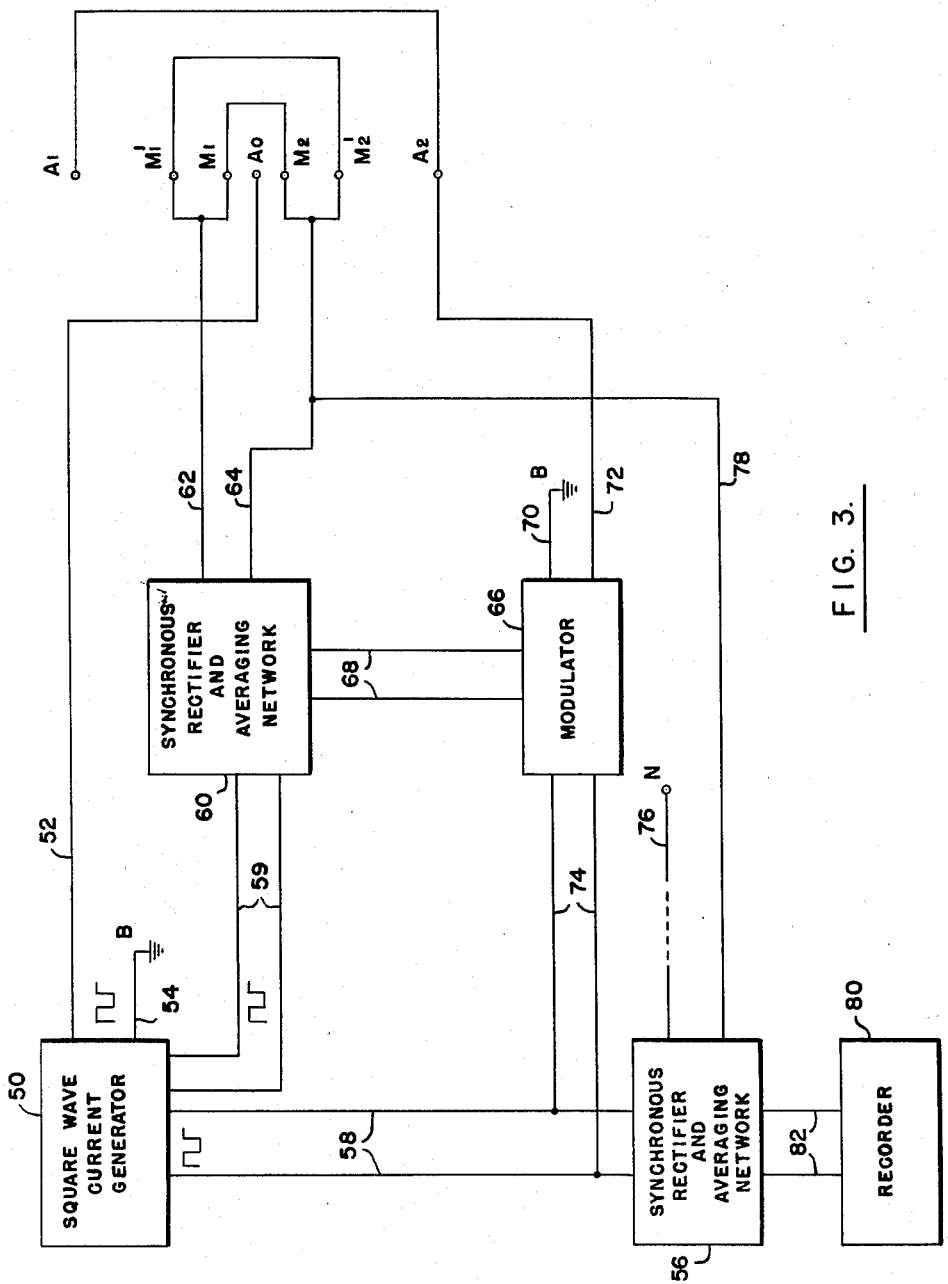

United States Patent Office

3,182,250
Patented May 4, 1965

3,182,250
SURFACE ELECTRICAL PROSPECTING APPARATUS UTILIZING CURRENT FOCUSING ELECTRODE MEANS
Fred M. Mayes, Richardson, Tex., assignor to Sun Oil Company, Philadelphia, Pa., a corporation of New Jersey
Filed Feb. 23, 1962, Ser. No. 175,030
3 Claims. (Cl. 324—1)

This invention relates to methods and apparatus for surface electrical prospecting and involves the use of a current focusing electrode means for surface prospecting.

The current focusing electrode apparatus comprises a control or guard electrode means positioned on opposite sides of a current emitting electrode and control means for maintaining the potential of the guard electrodes such that the current from the emitting electrode is focused or forced along a path perpendicular to the longitudinal axis of the electrodes.

While the invention is particularly useful for offshore electrical prospecting, it will be apparent that it is applicable to surface electrical prospecting generally, including that carried out on land.

The invention is of special importance in offshore electrical prospecting because offshore measurements are made by towing a long multi-conductor cable either on the surface or below the surface of the water which makes it quite practical to use the focusing electrode arrays which employ very long electrodes or a large number of point electrodes. Also, these focusing electrode arrangements are particularly useful in offshore prospecting where there is present a layer of very low resistivity salt water over the sediments of interest, producing for most electrical prospecting such short circuiting as to render useful signals very small. However, in the focused current system, the shallow low resistivity layer is effectively in series with the electrodes and will thus not affect to any objectionable extent the measured resistivity whereby more accurate readings of the resistivity may be obtained.

It is the general object of this invention to provide a method and apparatus of surface electrical prospecting which employs a focusing electrical arrangement. This object and other objects and features of the invention will become apparent from the following description read in conjunction with the accompanying drawing in which:

FIGURE 3 is a schematic illustration of a control system for the electrodes and the recording means.

Figure 1:
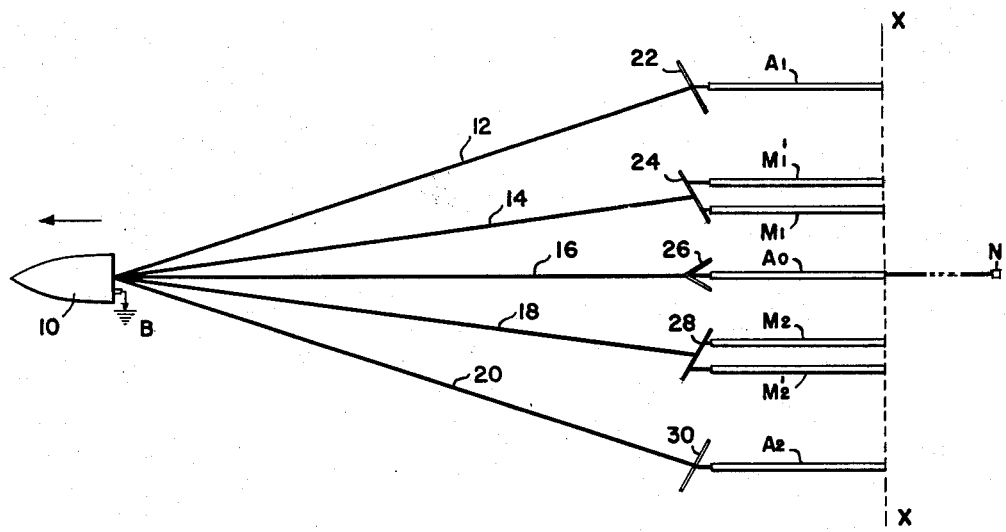
FIGURE 1 is an illustration of one form of apparatus for offshore electrical prospecting in accordance with the invention.

In the form of the invention shown in FIGURE 1, a boat 10 is adapted to support the ends of a plurality of insulated cable conductors 12, 14, 16, 18 and 20. The cables may be mounted on reels positioned on the stern of the boat 10 whereby the cables may be reeled onto the boat or unreeled to the desired extent for towing by the boat. Paravanes 22, 24, 26, 28 and 30 are mounted on the extended ends of cables 12, 14, 16, 18 and 20, respectively, and are adapted to position the electrodes that are mounted adjacent the paravanes at the desired spacing as is illustrated in FIGURE 1.

The electrical configuration disclosed in FIGURE 1 comprises a focusing electrode arrangement. There is provided a plurality of electrodes, $A_1$, $M_1'$, $M_1$, $A_0$, $M_2$, $M_2'$ and $A_2$, these electrodes being mounted on the paravanes 22 to 30 as shown in FIGURE 1. This array of electrodes moves as a unit across the prospecting surface in accordance with the movement of the boat 10 which tows the electrodes in the position shown in FIGURE 1.

The electrical interconnections of the electrodes are shown in FIGURE 3. The electrodes $M_1$ and $M_2$ are spaced an equal distance from the electrode $A_0$ and are electrically connected by insulated conductors passing through cables 14 and 18. The electrodes $M_1'$ and $M_2'$ are spaced an equal distance from the electrode $A_0$ with a spacing greater than the spacing of electrodes $M_1$ and $M_2$ and are electrically connected by insulating conductors passing through cables 14 and 18. The electrodes $A_1$ and $A_2$ are equally spaced from electrode $A_0$ a distance greater than electrodes $M_1'$ and $M_2'$ and are electrically connected by insulated conductors passing through cables 12 and 20. A reference potential electrode N is mounted on a paravane 26 along with electrode $A_0$ and is positioned a substantial distance from the electrode $A_0$. A ground electrode B is immersed in the water at a location adjacent to boat 10.

Electrical fields are established on opposite sides of the current emitting electrode $A_0$ by the control electrodes. These electrical fields are controlled as hereafter described to restrict flow of current longitudinally of the extent of the array so that the emitted current is focused or forced to flow along a laterally extending path. The focused path in the apparatus in accordance with this invention is along a plane perpendicular to the surface of the formation to be logged. It is desirable that the current emitted from electrode $A_0$ be substantially constant in intensity and that the current emitted from the electrodes $A_1$ and $A_2$ be so to maintain a potential difference between the electrodes $M_1$, $M_1'$ and electrodes $M_2$, $M_2'$ (which, as indicated, are connected in pairs) at a substantially zero value. A log of the formation resistivity is made by recording the variation in the potential between the location where the field is being maintained substantially at zero, namely, at either of the electrode pairs $M_1$, $M_1'$, or $M_2$, $M_2'$, and the reference potential electrode N as the apparatus is moved across the area to be logged.

In the focusing arrangement described above the current emitted from the electrode $A_0$ will be restricted against flow laterally beyond the electrodes $M_1$, $M_1'$ and the electrodes $M_2$, $M_2'$. The emitted current will flow into the earth in a direction substantially perpendicular to the surface and will be confined to a longitudinally extending interval defined by a longitudinal line medially between electrodes $M_1$ and $M_1'$ and a longitudinal line medially between electrodes $M_2$ and $M_2'$. In accordance with this focusing electrode arrangement, the lines of current remain substantially parallel to one another for a substantial distance extending downwardly into the earth.

The electrical configuration disclosed in FIGURE 1 is essentially three dimensional since each of the electrodes $A_1$, $M_1'$, $M_1$, $A_0$, $M_2$, $M_2'$ and $A_2$ is extended lengthwise in a direction perpendicular to the direction in which the electrodes are spaced, each electrode being of the same length. The electrical prospecting being accomplished by propelling the boat 10 in the direction indicated by the arrow in FIGURE 1 to tow the electrodes in a direction perpendicular to the direction in which the electrodes are spaced, the resistivity measurements are made along a line of progress perpendicular to the electrode array. The paravanes are set at angles to maintain the proper location of each electrode such that the electrodes are in transverse alignment as is illustrated by line X—X in FIGURE 1. Also, the electrodes are maintained at spaced equal distances from the central electrode $A_0$ as was previously described.

Figure 2:
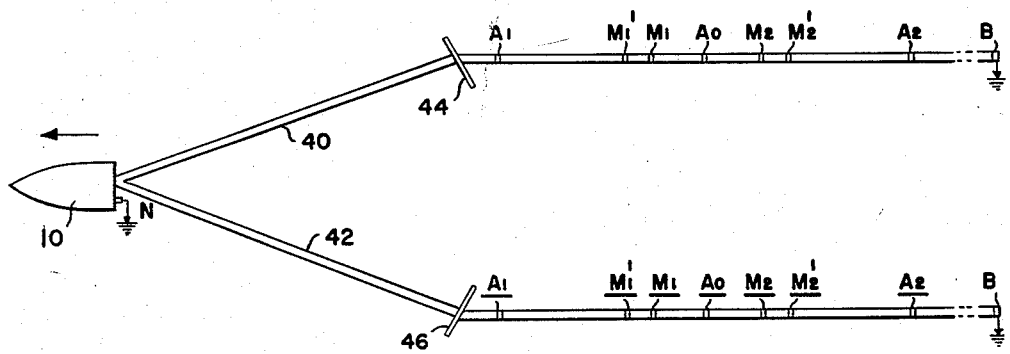
FIGURE 2 is an illustration of a second form of apparatus for offshore electrical prospecting in accordance with the invention.

In the form of the invention shown in FIGURE 2, the boat 10 has a pair of multi-conductor cables 40 and 42 extending from the stern thereof. The conductors 40 and 42 are connected to paravanes 44 and 46, respectively, which are set at angles to space the cables as shown in FIGURE 2. The portion of cable 40 extending rearwardly of paravane 44 has mounted thereon the point electrodes $A_1$, $M_1'$, $M_1$, $A_0$, $M_2$, $M_2'$ and $A_2$, which electrodes provide a focusing arrangement such as that described with respect to the FIGURE 1 apparatus with the exception that point electrodes are involved and these electrodes are spaced along an axis extending in a direction parallel to the direction of movement of the boat 10. The portion of cable 42 rearwardly of paravane 46 has a plurality of point electrodes $\underline{A}_1$, $\underline{M}_1'$, $\underline{M}_1$, $\underline{A}_0$, $\underline{M}_2$, $\underline{M}_2'$ and $\underline{A}_2$ mounted thereon, which electrodes are similar to those mounted on the cable 40 and also provide a focusing electrode system as described above.

The focusing electrode arrays mounted on each of the cables 40 and 42 are electrically connected in the same manner as the array disclosed in FIGURE 1, the electrical connections being shown in FIGURE 3, the corresponding symbol of identification being used for corresponding electrodes, these symbols being conventional in the art. The reference potential electrode N is connected to ground at a location adjacent the boat 10. The surface electrodes B are grounded at locations spaced from the electrode arrays on cables 40 and 42, respectively. The electrodes with corresponding designations are connected together at the boat 10 since it may be assumed that the current supplied to these electrodes divides equally between corresponding electrodes along the cables 40 and 42. If desired, the potentials of separate electrodes may be added together to provide the average potential of the electrode pairs.

It will be apparent that the above described electrode arrangement may be variously arranged. For example, instead of the paravanes, a plurality of tow boats may be used to space the electrodes. Moreover, there may be any desired number of parallel focusing electrode systems.

In surface prospecting it is desirable to employ a direct current or a very low frequency alternating current in order to obtain deep penetration. Also, because of the large inter-electrode distances involved in surface logging, the potentials observed in surface measurements are very small and these are likely to be interfered with by potentials due to natural or man made earth currents. In surface prospecting these problems are solved by employing very low frequency square wave current excitation, synchronously rectifying the potential signals and averaging over a number of cycles the square wave to reduce the effect of noise potentials having other frequencies.

One form of such instrumentation is schematically illustrated in FIGURE 3. In accordance with this system, there is involved synchronous rectification of the potential $M_1$—$M_2$, averaging this potential over a number of cycles of the exciting current and using this signal to control the amplitude of the square wave current feed to $A_1$, $A_2$, so that, on the average, the potential difference between $M_1$—$M_2$ due to the combined efforts of the square wave currents introduced to $A_0$, $A_1$ and $A_2$ is zero. In accordance with the system shown in FIGURE 3, there is also involved synchronous rectification and averaging of the common potential $M_1$, $M_1'$ which is equal on the average to $M_2$, $M_2'$.

The control system schematically illustrated in FIGURE 3 comprises a square wave generator 50 which delivers a square wave to electrodes $A_0$ and B through conductors 52 and 54, respectively. The generator 50 also delivers a square wave to a control apparatus 56 through conductor 58, this apparatus comprising a synchronous rectifier and an averaging network. A control apparatus 60 receives an input from electrodes $M_1$, $M_1'$ through conductor 62 and an input from electrodes $M_2$, $M_2'$ through a conductor 64. Control apparatus 60 comprises a synchronous rectifier and an averaging network and is supplied with a synchronizing signal from generator 50 through conductors 59. Control apparatus 60 drives a modulator 66 through conductors 68, modulator 66 being connected to ground electrode B through conductor 70, to the common potential of electrodes $A_1$, $A_2$ by a conductor 72, and to square wave generator 50 by conductors 74 and 58. Control apparatus 60 drives modulator 66 to provide a square wave current to electrodes $A_1$, $A_2$ to make the potential difference $M_1$—$M_2$ equal to zero on the average. Modulator 66 receives a signal from control apparatus 60 in accordance with the synchronous rectification of the potential $M_1$—$M_2$ averaged over a number of cycles of the exciting current and utilizes this signal to control the amplitude of the square wave current fed to electrodes $A_1$, $A_2$ so that the potential difference between $M_1$—$M_2$ due to the combined effects of the currents introduced at electrodes $A_0$, $A_1$ and $A_2$ is zero.

Control apparatus 56 is connected to the reference electrode N through a conductor 76 and to the common potential $M_2$, $M_2'$ through a conductor 78. Control apparatus 56 operates a conventional recorder 80 through conductors 82 to provide an indication of the average potential of electrodes $M_2$, $M_2'$ with respect to the reference potential of electrode N which is spaced a considerable distance from the outer electrodes. Thus, there may be obtained a log of the electrical resistivities of the earth formations beneath the electrode array.

In the operation of the prospecting systems in accordance with this invention, the boat 10 is moved continuously across the area to be studied. Continuous logs are made as the boat and the electrodes move across the formation. By reason of the method in accordance with this invention which involves the use of focusing electrodes, there is avoided the possibility of the low resistivity layer adjacent the electrodes shunting the measuring current. The focusing current system drives the current into the formation beneath this low resistivity layer which in effect is in series with the electrodes and does not contribute to the measured resistivity.

It will be apparent that many modifications of the methods and apparatus disclosed herein may be made without departing from the scope of the invention wherefore it is not desired to be limited except as required by the following claims.

What is claimed is:

1. Electrical resistivity logging apparatus for the logging of formations covered by water comprising a boat, an electrode array comprising at least one current emitting electrode and control electrodes for focussing current emitted from said current electrode substantially vertically into the water covered formations, said electrode array, comprising a plurality of elongated members individually connected to said boat for towing thereby by corresponding cables including conductors connected to the electrodes, said members being mechanically independent of each other except for their common connection to the boat through said cables, paravanes individually secured to said members and their respective cables and disposed to produce extensive spacing of said members laterally of the direction of towing thereof by said boat so that the electrode array is spread over a wide region transverse to the direction of towing, and apparatus carried by said boat and electrically connected to said electrodes through said cables to provide said current and focusing current to said control electrodes and to record indications of electrical resistivity of said formations during passage of the electrode array thereacross.

2. Electrical resistivity logging apparatus for the logging of formations covered by water comprising a boat, an electrode array comprising at least one current emitting electrode and control electrodes for focussing current emitted from said current electrode substantially vertically into the water covered formations, said electrode array comprising a plurality of elongated members individually connected to said boat for towing thereby by corresponding cables including conductors connected to the electrodes, said members being mechanically independent of each other except for their common connection to the boat through said cables, paravanes individually secured to said members and their respective cables and disposed to produce extensive spacing of said members laterally of the direction of towing thereof by said boat so that the electrode array is spread over a wide region transverse to the direction of towing, and apparatus carried by said boat and electrically connected to said electrodes through said cables to provide said current and focusing current to said control electrodes and to record indications of electrical resistivity of said formations during passage of the electrode array thereacross, each member providing an individual electrode extended in the direction of towing.

3. Electrical resistivity logging apparatus for the logging of formations covered by water comprising a boat, an electrode array comprising at least one current emitting electrode and control electrodes for focussing current emitted from said current electrode substantially vertically into the water covered formations, said electrode array comprising a plurality of elongated members individually connected to said boat for towing thereby by corresponding cables including conductors connected to the electrodes, said members being mechanically independent of each other except for their common connection to the boat through said cables, paravanes individually secured to said members and their respective cables and disposed to produce extensive spacing of said members laterally of the direction of towing thereof by said boat so that the electrode array is spread over a wide region transverse to the direction of towing, and apparatus carried by said boat and electrically connected to said electrodes through said cables to provide said current and focusing current to said control electrodes and to record indications of electrical resistivity of said formations during passage of the electrode array thereacross, at least one of said members carrying a plurality of electrodes spaced in the direction of towing.

References Cited by the Examiner
UNITED STATES PATENTS

| | | | |
|---|---|---|---|
| 840,018 | 1/07 | Von Schoultz | 324—1 |
| 2,872,638 | 2/59 | Jones | 324—9 X |
| 3,060,373 | 10/62 | Doll | 324—10 X |
| 3,103,625 | 9/63 | Mayes | 324—10 X |
| 3,105,191 | 9/63 | Schopper | 324—10 |

WALTER L. CARLSON, *Primary Examiner.*
JAMES W. LAWRENCE, *Examiner.*